United States Patent [19]

Grocke et al.

[11] 4,179,022

[45] Dec. 18, 1979

[54] INSTALLATION FOR THE PRODUCTION OF A MULTIPLE ROW CASK OF CONTAINERS

[75] Inventors: Diethelm W. K. Grocke, Nüremberg; Klaus Wittmann, Lauf-Schönberg, both of Fed. Rep. of Germany

[73] Assignee: NUTRO Patentverwertungs- und Maschinenhandels-GmbH, Nüremberg, Fed. Rep. of Germany

[21] Appl. No.: 827,183

[22] Filed: Aug. 23, 1977

[30] Foreign Application Priority Data

Aug. 25, 1976 [DE] Fed. Rep. of Germany ....... 2638280

[51] Int. Cl.² .................. B65G 43/08; B65G 47/68; G06M 7/00
[52] U.S. Cl. .................................. 198/437; 198/442; 198/485; 198/503
[58] Field of Search ............... 198/418, 419, 425, 436, 198/437, 442, 485, 491, 492, 503, 631, 836; 214/6 P, 6 N; 53/159, 164

[56] References Cited

U.S. PATENT DOCUMENTS

| | | | |
|---|---|---|---|
| 1,316,160 | 9/1919 | Johnson | 198/436 X |
| 2,437,214 | 3/1948 | Tremblay | 198/442 |
| 2,659,495 | 11/1953 | Botley | 214/6 N |
| 2,784,832 | 3/1957 | Thomson, Jr. | 198/627 |
| 3,193,078 | 7/1965 | Amenta et al. | 198/442 |
| 3,301,376 | 1/1967 | Winter et al. | 198/442 |
| 3,481,107 | 12/1969 | Andblad et al. | 53/159 |
| 3,511,360 | 5/1970 | Jagiel | 198/836 |
| 3,822,006 | 7/1974 | Shuttleworth | 198/442 |

*Primary Examiner*—James L. Rowland
*Attorney, Agent, or Firm*—Sughrue, Rothwell, Mion, Zinn and Macpeak

[57] ABSTRACT

Shiftable L-shaped guide tracks are provided perpendicular of the direction of conveyance of the conveyor belt in an installation for introducing containers sequentially into several tracks disposed in parallel side-by-side fashion.

7 Claims, 2 Drawing Figures

INSTALLATION FOR THE PRODUCTION OF A MULTIPLE ROW CASK OF CONTAINERS

FIELD OF THE INVENTION

The invention relates to an installation for the production of a multiple row cask of containers such as bottles, glasses etc. with a delivery track for the containers which leads to a conveyer belt and with a guide channel for the introduction of the containers in several tracks arranged side by side in parallel.

BACKGROUND OF THE INVENTION

Such an installation has become known through the German AS No. 11 29 101. There, the bottles are conveyed in two rows in a feed track to a conveyer belt. Above the conveyer belt, a guidance likewise developed in two rows has been disposed which is swivelable around the vertical axis so that as a result of swiveling of this guide, the bottles may be conducted in several tracks disposed side by side and limited by lateral guides and may be lined up there. An essential disadvantage of this known installation consists in the fact that during swiveling of the bottle guide around the vertical axis, there is a danger of bottles striking against the front edge of the lateral guides disposed between the tracks. Because of this danger, the conveying speed of the bottles through the swivelable guide may only be set relatively low in order to avoid any destruction of bottles. As a result of that the performance of the installation is limited. A further disadvantage of this installation consists in the fact that an adjustment for bottles of a different size, especially of a different diameter is possible only at great expense.

It has also been known to feed containers in one row to a shunting shift, shiftable perpendicularly in relation to the path of movement of the containers, the length of which slide corresponds to the desired length of the rows. Whenever the desired length of rows has been shunted, a conveyor belt moves the cask to a machine slide of a packaging machine. However, with such an arrangement, no great performance can be achieved either, since during the shunting of a row, the subsequent containers must be stopped.

The task of the present invention consists in avoiding the inadequacies of the known installations and in creating an installation of the initially mentioned type with which the production of a multirow cask of containers is possible in a simple and uninterrupted manner with a great conveying performance. In addition, the installation is supposed to be convertible with a slight expenditure to different sizes of containers.

SUMMARY OF THE INVENTION

The task according to the invention will be solved through the face that the guide channel has an L-shape, whereby a first leg is aligned parallel to the direction of conveyance of the conveyer belt and the second leg is aligned coaxially in relation to the feed track, and in that the L-shaped guide channel is shiftable perpendicularly in relation to the direction of conveyance of the conveyer belt in such a way that the end of the second leg is continuously connected with the feed track and the end of the first leg always leads to one of the tracks arranged in parallel.

One advantage of the installation according to the invention consists in the fact that in case of the transition of the guide channel from one track to the next one, the danger of the containers striking against the front edge of the lateral guides of the tracks is elminated at least in those cases, where the shifting of the guide channel in that case takes place in the direction of the containers arriving on the feed track, since at the moment of the shifting of the guide channels, the conveying pressure coming from the feed track on the containers slackens.

In the case of an advantageous embodiment of the installation of the invention a counting installation for the containers is disposed at the end of the guide channel which on the one hand is coupled with a control apparatus for the shifting of the L-shaped guide channel and on the other hand with a blocking arrangement for the containers disposed at the end of the first leg of the L-shaped guide channel. As a result of that, disturbances in the case of shifting of the guide channel from one track to the next one are effectively avoided both in the direction of the containers arriving in the feed track as well as in the counter direction.

A conversion of the installation for various sizes of containers, that is to say especially of container diameters, takes place according to the invention in a manner brought about simply through the fact that the L-shaped guide channel is formed essentially of two L-shaped side rails, one of which is shiftable relative to the other in the direction of the angle bisector between the legs.

Another advantageous development of the invention consists in the fact that the tracks are limited by parallelly arranged lateral guides and that they form a first magazine following the guide channel at the end of which a shiftable lock mechanism has been disposed. Whenever all the tracks are filled with the desired number of containers, the continued conveyance of the containers now disposed in several rows by the conveyer belt is arranged by releasing the locking mechanism.

Another effective embodiment of the invention consists in the fact that a second sector of the tracks forms a second magazine which follows the first one and in that adjustable stops which may be moved out upwards, are disposed in the track sectors of the second magazine in the direction of conveyance of the conveyer belt, which stops make possible an alignment of the individual rows of containers with a view to the gap and the continued transportation of the containers to a subsequent packaging machine. Such space-saving casks of spaced rows of containers are suitable particularly well for the packaging exclusively by means of a shrinking foil, since these casks per se have a relatively great strength.

Additional advantageous developments of an installation of the invention will be explained within the scope of the succeeding description of an embodiment of an installation according to the invention on the basis of the drawing.

DESCRIPTION OF THE PREFERRED EMBODIMENT

Figure 1:
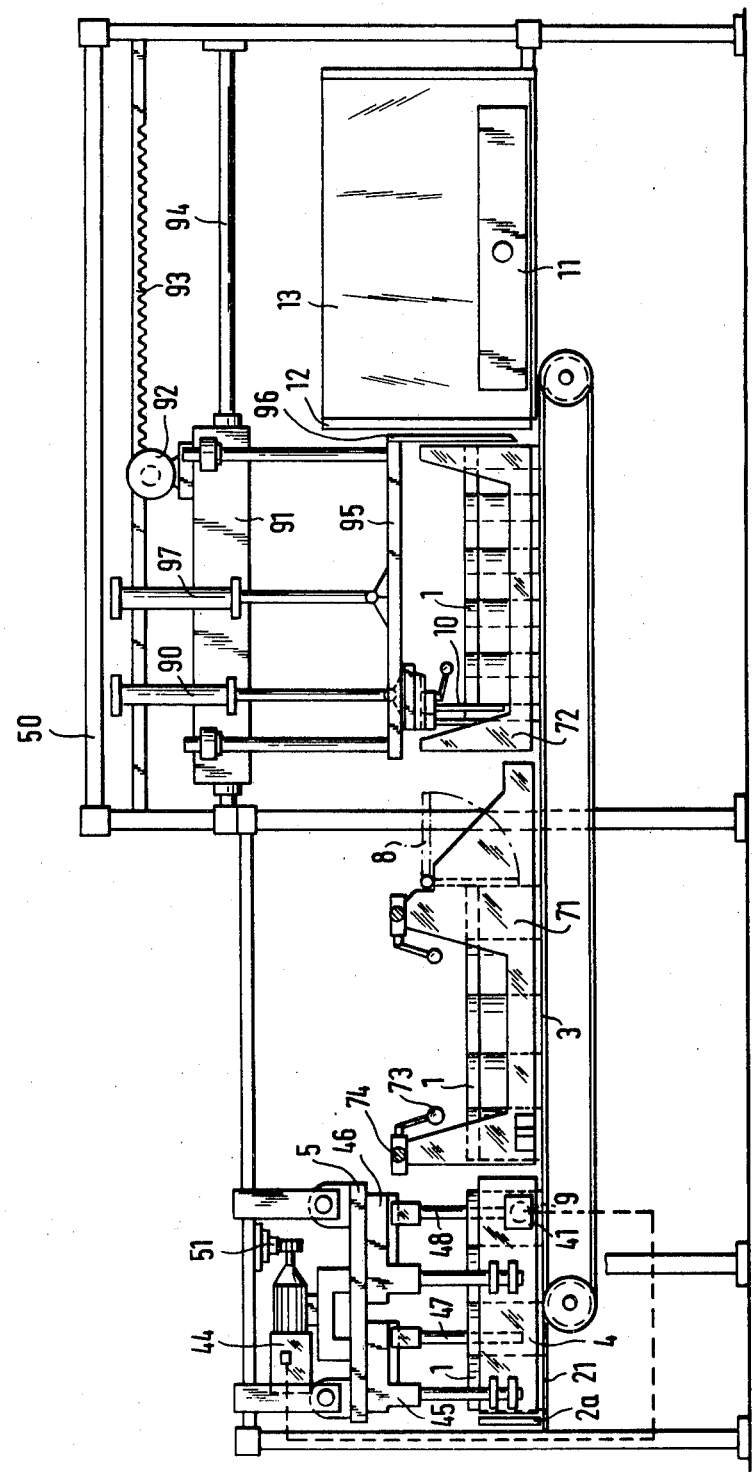
FIG. 1 is a schematic presentation of an installation according to the invention, in side view.
Figure 2:
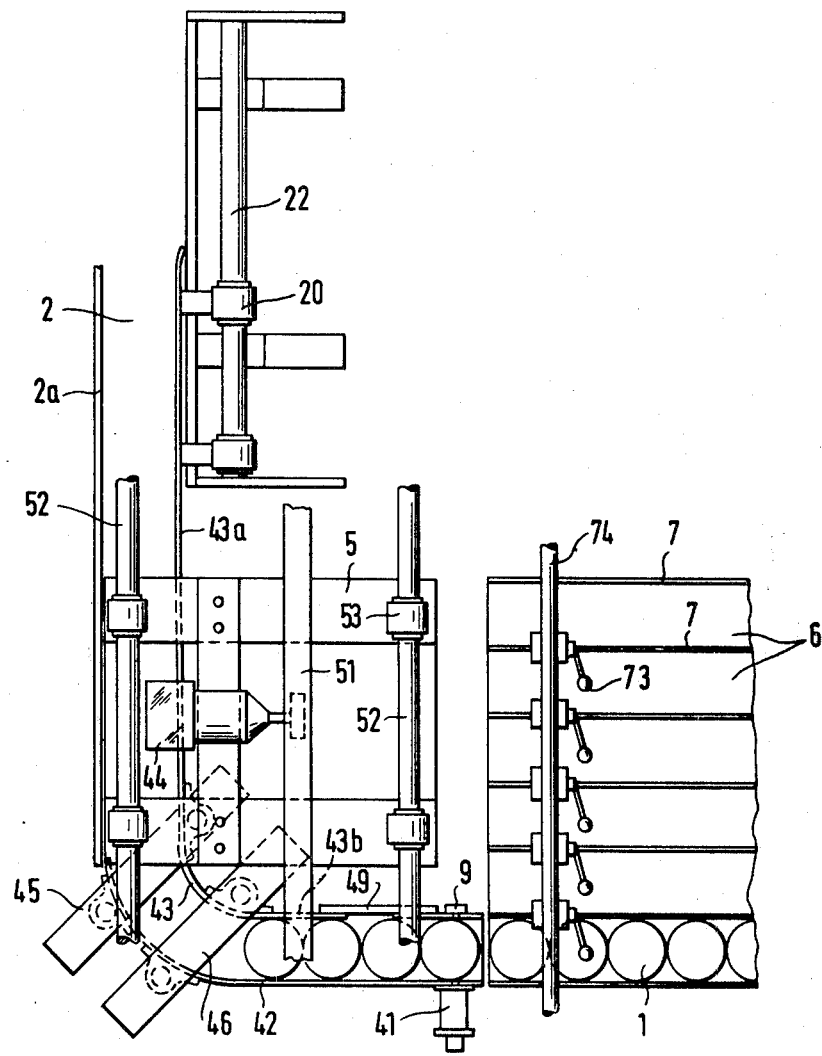
FIG. 2 is an installation according to FIG. 1 by segment in top view.

In the side view of the installation shown according to FIG. 1, a porchlike frame 50 for the reception of the individual construction groups of the installation is shown. The containers 1 to be put together in one package are conveyed from the end of a delivery track 2 (see FIG. 2) of which in FIG. 1 only a lateral limiting track 2a is visible, with the help of a guide channel 4 to a conveyer belt 3. The delivery track 2 in FIG. 1 runs perpendicularly in relation to the plane of the drawing. Up to the delivery to the conveyer belt 3, the containers 1 are either within the delivery track 2 or within the guide channel 4, on a connecting metal sheet 21. The guide channel 4 has an L-shape as can be seen from FIG. 2. At the same time, the first leg stands parallel to the direction of conveyance of the conveyer belt 3, and the second leg is aligned coaxially in relation to the delivery track 2. Above the conveyer belt 3, there is a first magazine 71 which follows the guide channel 4. This first magazine 71 comprises several adjacent tracks 6 for the lining up of the containers 1, whereby the tracks 6 are limited by parallelly arranged lateral guides 7 (FIG. 2). As seen from FIG. 2, the magazine 71 has six tracks 6 lying side by side which are limited by altogether seven guides 7 disposed in parallel, side by side. The guides 7 may be fixed on guide rods 74 running transversely to the conveyer belt 3, adjustable transversely in relation to the direction of transportation and fixable in their pertinent position by means of instantaneous locking mechanisms 73. This adjustability offers the possibility of adjusting the width of the track depending on the size of the container to be handled.

Following the magazine 71 in the direction of conveyance, there is a second magazine 72 above the conveyer belt 3, in which in a similar manner as in the magazine 71, a corresponding number of tracks are formed by means of a corresponding number of guides. In the magazine 72, the width of the tracks is also to be adjustable in the same manner as in the magazine 71, whereby the details required for this are not shown in the figures. The second magazine 72 is followed in the direction of conveyance by a packaging machine 12 with a machine slide 11 to which the completely assembled packages of containers 1 are conveyed and which on its part guides the packages perpendicularly in relation to their path of movement maintained up to that point, to a curtain 13 of foils, where the packages finally are packaged in a shrinking foil.

Starting out from the position of the installation according to FIG. 2, the movement of the containers 1 through the installation will be described: The containers arriving on the delivery track 2 migrate in a row through the guide channel 4 for such a length of time into the first track 6 of the first magazine 71 until the preprogrammed numbers of containers has been reached.

The continuously running conveyer belt 3 takes over the conveyance of the containers as soon as they leave the connecting sheet 21. At the same time a preferably photoelectric counting arrangement 9 attached at the end of the guide channel 4 will count the containers 1 lined up on the first track 6 and at the moment in which the preprogrammed number of containers has arrived, it switches a blocking arrangement 41 which holds the one or the last containers 1 in the guide channel 4. The blocking arrangement may, for example, consist of a pneumatically or hydraulically operable punch. At the same time, the counting arrangement 9 will switch a control arrangement for the shifting of the guide channel 4 perpendicularly in relation to the direction of conveyance of the conveyer belt 3 to the next track 6 of the first magazine 71. The shifting of the guide channel 4 is accomplished with the help of a shifting carriage 5, on which the guide channel 4 has been attached. In the case of the embodiment shown, the shifting takes place in such a way that a motor 44 attached on the shifting carriage 5 engages via a pinion with a toothed rod 51 attached on the frame 50 of the installation. At the same time, the shifting carriage 5 moves with sliding guides 53 on gliding rods 52 which are fixed in the frame 50. As soon as the leg of the guide channel 4 aligned in parallel to the conveyer belt 3 is aligned with the second track of the first magazine 71, the motor 44 is switched off and the blocking arrangement 41 is released.

As soon as the first magazine 71 is filled with containers 1 which in the case of the embodiment drawn, will be the case whenever the six tracks are equipped always with five containers, the locking mechanism 8 is swivelled upwards as is indicated in FIG. 1, and the containers 1 assembled in that way are guided by the conveyer belt 3 into the second magazine 72. After the transfer of the containers into the second magazine and lowering of the locking mechanism 8, the filling of the first magazine 71 with containers may be continued from the guide channel.

During the transition of the group of containers into the second magazine 72, stops 10 which are always located at the entrance of the tracks 6 in the magazine 72 and which may be displaced, have been moved out from the tracks in an upward direction. This moving out takes place with the help of a lifting arrangement 90, which is disposed in a conveying carriage 91. An additional lifting arrangement 97 is likewise disposed on the conveying carriage 91 with which a frame 95 may be lifted up, on which a stop plate 96 extending over the entire width of the magazine 72, is attached. The group of containers coming from the first magazine 71 is conveyed by the conveyer belt 3 in the direction of conveyance until the foremost containers 1 of all tracks abut against the stop plate 96. After that, the stops 10 which are disposed displaced, are lowered downwards with the help of the lifting arrangement 90 into a position as shown in FIG. 1. Now the conveying carriage 91 moves, driven by a motor 92, and with the help of a pinion engaging with a toothed rack 93, to the packaging machine 12 and at the same time pushes the row of containers by means of the stops 10 to the machine slide 11.

As a result of the displaced arrangement of the stops 10, the individual rows of containers are aligned with a gap in the track 6 so that they will arrive in a completed grouping at the machine slide 11 and they can then be surrounded with the web of foil 13. Before the conveying carriage 91 which is guided on rods 94 may be brought back into its position above the second magazine 72, the frame 95 and thus the stop plate 96 is lifted by means of the lifting arrangement 97 so that it may be guided away over the container group in front of the machine slide 11.

For the purpose of changing over the installation for other sizes of containers, as has already been described further above, the width of the tracks 6 in the magazines 71 and 72 is changed. At the same time, the width of the guide channel 4 is changed. For this purpose, it is necessary merely to shift the inside, L-shaped, lateral rail 43 of the guide channel 4 in the direction of the bisector between the legs of the guide channel in relation to the outside lateral rail 42. The guide tracks 45 and 46 for the lateral rail 43 running at an angle of 45° in relation to the direction of the feed track 2, are attached to the shifting carriage 5. Holding rods 47, 48 to which the lateral rail 43 is attached, slide on said guide tracks 45, 46. In order to make possible an equalization of length in the direction of the two legs during the shifting of the lateral rail 43 along the guide tracks 45, 46, one of the legs 43a of the lateral rail 43 is mounted by means of gliding guides 20 on a guide rod 22 aligned in parallel with the feed track 2. The guide rod 22 on its part is kept such that it may be shifted transversely to the direction of the feed track 2. The equalization of length of the second leg 43b of the lateral rail 43 is accomplished by means of a sliding element 49. On the basis of this possibility of adjustment of the guide channel 4 and of a corresponding shifting of the tracks 6 as well as the shiftability of the stops 10 in the direction of conveyance of the conveyer belt, any desired form and size of containers such as bottles, glasses, etc., may be processed on this installation. The installation may be used preferably in the glass industry for packaging of bottles.

We claim:

1. An installation for the production of a multirow cask of containers such as bottles, glasses, etc., including a conveyor belt, a feed track for the containers leading to said conveyor belt, and a guide channel for the introduction of the containers into several magazine tracks disposed in parallel side by side fashion, the improvement wherein the guide channel is of L-shape, formed of spaced lateral rails, said rails being continuous and including a first leg aligned in parallel to the direction of conveyance of the conveyor belt and a second leg integral with said first leg and extending coaxially to the feed track, means for stepwise shifting the L-shaped guide channel perpendicularly in relation to the direction of conveyance of the conveyor belt such that the end of the second channel leg is continuously connected with the feed track with its rails aligned therewith and the end of the first channel leg is stepwise connected to a given one of the parallel magazine tracks with its rails aligned therewith such that said bottles, glasses, etc., are fed sequentially to a given magazine track with the L-shaped guide channel stationary during feeding of multiple containers to said given magazine track.

2. The installation as claimed in claim 1, further comprising a counting mechanism for the containers disposed at the end of the guide channel, said counting mechanism being coupled with a control arrangement for effecting the shifting of the L-shaped guide channel, and wherein said counting mechanism is further coupled with a first blocking arrangement for the containers, attached at the end of the first leg of the L-shaped guide channel, and means for mounting one of said lateral rails of said L-shaped guide channel for shifting in the direction of the bisector between the two legs and relative to the other lateral rail.

3. The installation as in claim 2, wherein the parallel side by side magazine tracks are limited by lateral guides and in that they form a first magazine following the guide channel, at the end of which a shiftable locking mechanism has been disposed.

4. The installation as in claim 3, wherein a second section of the magazine tracks forms a second magazine which is series connected to the first magazine, said installation further comprises stops for the individual rows of containers disposed in the sections of the track of the second magazine.

5. The installation as in claim 4, further comprising means for adjusting said stops in the direction of conveyance of the conveyor belt.

6. The installation as in claim 4, further comprising means for moving the stops out from the tracks in an upward direction.

7. The installation as claimed in claim 4, further comprising means for locking the lateral guides of the tracks in both magazines at transversely adjusted position in relation to the direction of conveyance.

* * * * *